(12) United States Patent
Chang et al.

(10) Patent No.: US 9,892,304 B2
(45) Date of Patent: Feb. 13, 2018

(54) FINGERPRINT IDENTIFICATION DEVICE AND METHOD OF MANUFACTURING SAME

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Chun-Te Chang, Hsinchu (TW); Chia-Chun Tai, Hsinchu (TW); Wei-Chung Chuang, Hsinchu (TW); Yen-Heng Huang, Hsinchu (TW)

(73) Assignees: INTERFACE OPTOELECTRONICS (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 182 days.

(21) Appl. No.: 14/920,330

(22) Filed: Oct. 22, 2015

(65) Prior Publication Data
US 2016/0283776 A1 Sep. 29, 2016

(30) Foreign Application Priority Data
Mar. 26, 2015 (CN) .......................... 2015 1 0135464

(51) Int. Cl.
*G06K 9/00* (2006.01)
*G01L 1/00* (2006.01)
*G01B 7/16* (2006.01)

(52) U.S. Cl.
CPC .................................. *G06K 9/0002* (2013.01)

(58) Field of Classification Search
None
See application file for complete search history.

(56) References Cited

U.S. PATENT DOCUMENTS

| | | | |
|---|---|---|---|
| 7,977,759 B2 * | 7/2011 | Jow ..................... | G06K 9/00006 257/433 |
| 9,558,390 B2 * | 1/2017 | Withers ............. | G01R 27/2605 |
| 2016/0148031 A1 * | 5/2016 | Lin ..................... | G06K 9/00053 382/124 |
| 2016/0149116 A1 * | 5/2016 | Wang ................... | H01L 41/1132 310/316.01 |
| 2016/0188032 A1 * | 6/2016 | Lin ....................... | G06K 9/0002 345/174 |
| 2016/0224821 A1 * | 8/2016 | Chang .................. | G06K 9/0004 |

* cited by examiner

*Primary Examiner* — Peter Macchiarolo
*Assistant Examiner* — Jermaine Jenkins
(74) *Attorney, Agent, or Firm* — ScienBiziP, P.C.

(57) ABSTRACT

A fingerprint identification device includes a fingerprint identification controller and a fingerprint identification sensor. The fingerprint identification sensor includes a substrate having a top surface, a bottom surface opposite to the top surface, and a side surface coupled between the top surface and the bottom surface. Sensor electrodes are arranged on the top surface, electrical leads couple the sensor electrodes and the fingerprint identification controller. The coupling leads extend from the top surface along the side surface to the bottom surface.

17 Claims, 5 Drawing Sheets

FINGERPRINT IDENTIFICATION DEVICE AND METHOD OF MANUFACTURING SAME

CROSS-REFERENCE TO RELATED APPLICATIONS

This application claims priority to Chinese Patent Application No. 201510135464.8 filed on Mar. 26, 2015 in the China Intellectual Property Office, the contents of which are incorporated by reference herein.

FIELD

The subject matter herein generally relates to a fingerprint identification device and a manufacturing method of the fingerprint identification device.

BACKGROUND

A fingerprint identification device can be an optical identification device, a resistive identification device, or a capacitive identification device. The capacitive identification device can include a plurality of sensor electrodes arranged on a substrate and a plurality of leads to transmit signals from the plurality of sensor electrodes. The quantity of the leads increases as higher resolution of fingerprint identification is required. Thus, when a finger touches the capacitive identification device, the leads arranged around the sensor electrodes are prone to generate signal interference.

BRIEF DESCRIPTION OF THE DRAWINGS

Implementations of the present technology will now be described, by way of example only, with reference to the attached figures.

DETAILED DESCRIPTION

Figure 1:
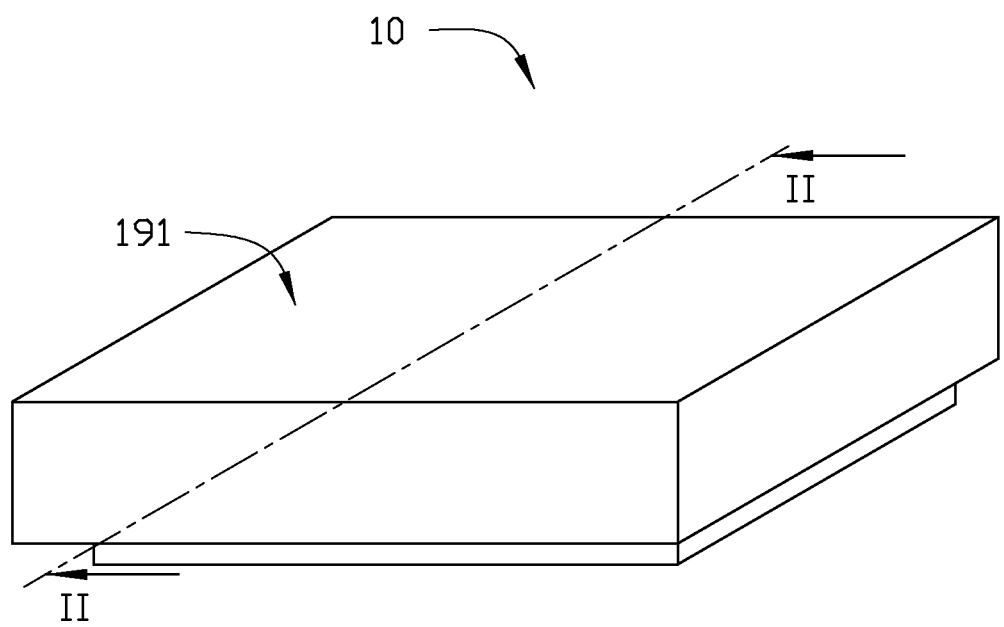
FIG. 1 is an isometric view of a fingerprint identification device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a fingerprint identification device 10 utilizing capacitive fingerprint identification. The fingerprint identification device 10 defines a contact sensing surface 191 touchable by external objects such as a finger of a user.

Figure 2:
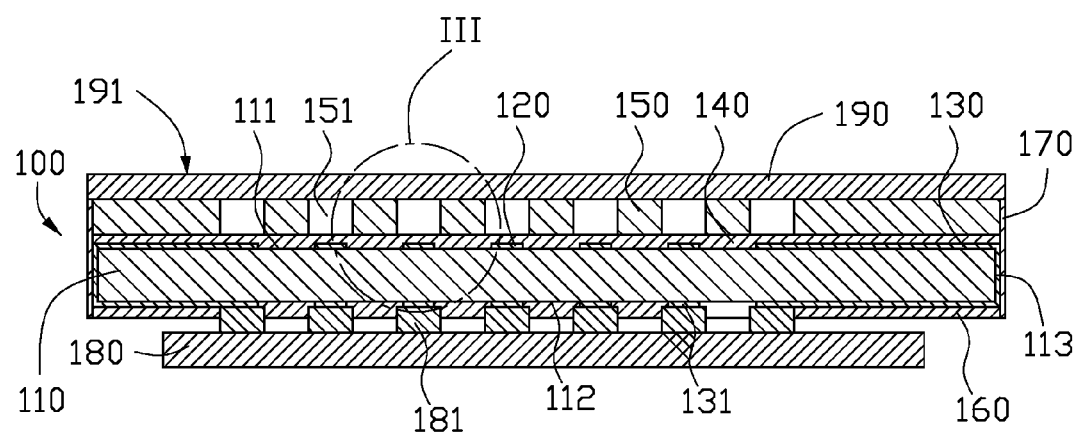
FIG. 2 is a cross sectional view of the fingerprint identification device of FIG. 1 taken along line II-II of FIG. 1.
Figure 3:
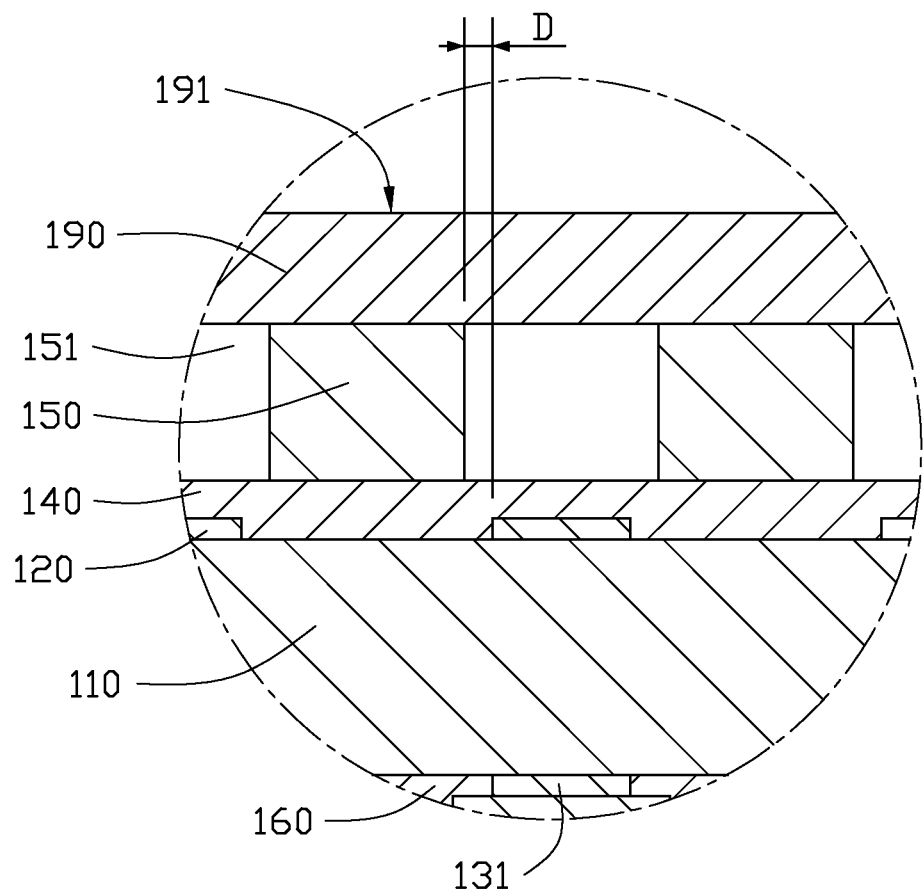
FIG. 3 is an enlarged view of circled part III of FIG. 2.
Figure 4:
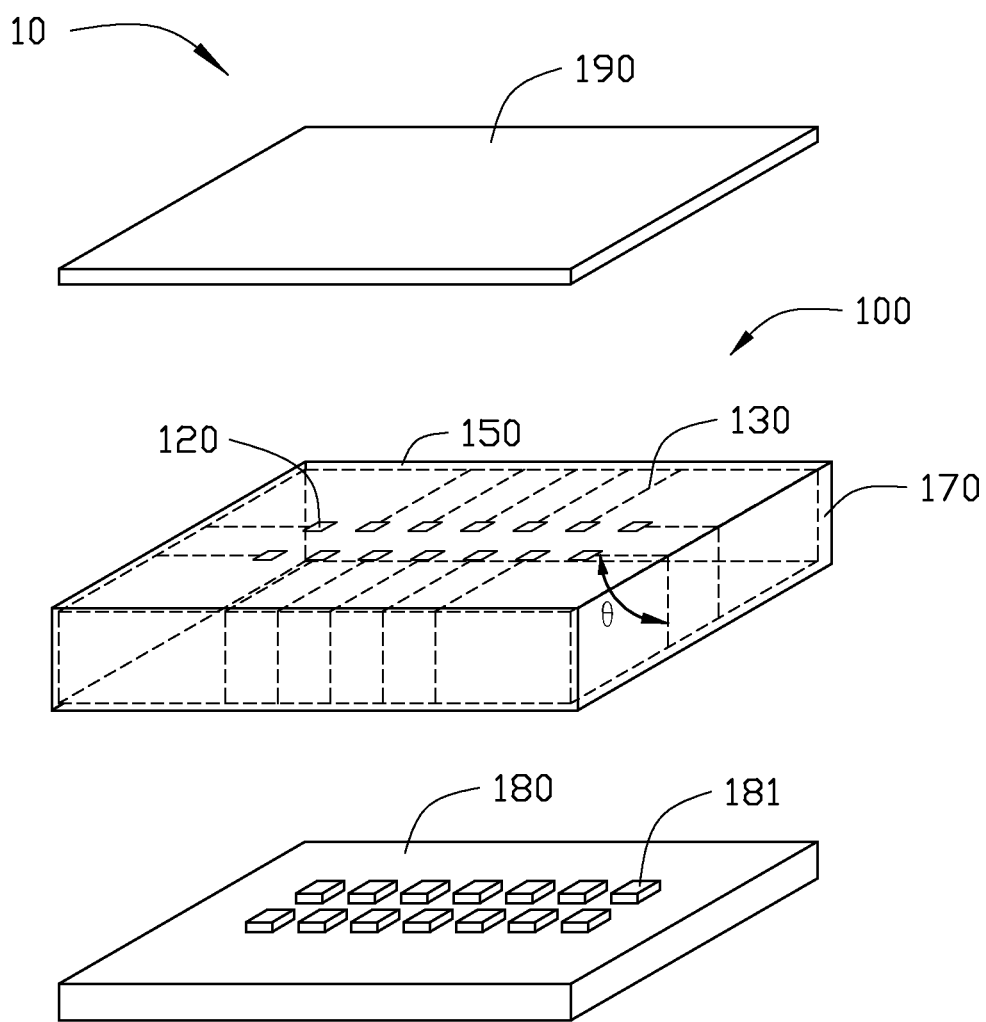
FIG. 4 is an exploded view of the fingerprint identification device of FIG. 1.

FIGS. 2-4 illustrate that the fingerprint identification device 10 can include a contact protection layer 190, a fingerprint identification sensor 100, and a fingerprint identification controller 180. The contact protection layer 190 covers the fingerprint identification sensor 100 to protect the fingerprint identification sensor 100. A surface of the contact protection layer 190 is defined as the contact sensing surface 191. The fingerprint identification sensor 100 is located on the fingerprint identification controller 180 and electrically coupled to the fingerprint identification controller 180. When the contact sensing surface 191 is touched, the fingerprint identification sensor 100 senses fingerprint information and transmits the fingerprint information to the fingerprint identification controller 180. The fingerprint identification controller 180 can include a plurality of interfaces 181 to receive the fingerprint data.

The contact protection layer 190 can be an anti-fingerprint (AF) film made of carbon matrix composite such as diamond-like carbon (DLC) and amorphous diamond. In the embodiment, the fingerprint identification controller 180 can be an application specific integrated circuit (ASIC).

The fingerprint identification sensor 100 can include a conductive layer 150, a first insulating layer 140, a plurality of sensor electrodes 120, a substrate 110, a plurality of leads 130, a protection adhesive 170, and a second insulating layer 160.

The substrate 110 can include a top surface 111, a bottom surface 112 opposite to the top surface 111, and a side surface 113 coupled between the top surface 111 and the bottom surface 112. In the embodiment, the substrate 110 can be made of strengthened glass, toughened glass, ceramic, sapphire, PET, or FPC.

The plurality of sensor electrodes 120 are arrayed on the top surface 111. The fingerprint identification controller 180 is located below the bottom surface 112. The plurality of leads 130 are arranged on the substrate 110. One end of each of the plurality of leads 130 is electrically coupled to a sensor electrode 120, and the other end of each of the plurality of leads 130 is electrically coupled to a controller interface 181.

In detail, the one end of each of the plurality of leads 130 extends along the side surface 113 to the top surface 111 to couple with the sensor electrodes 120, while the other end of each of the plurality of leads 130 extends along the side surface 113 to the bottom surface 112, to couple with the controller interface 181. The other end of each of the plurality of leads 130 can include a connecting pad 131 to couple with the controller interface 181.

The protection adhesive 170 covers the plurality of leads 130 to fix and protect the plurality of leads 130. In the embodiment, the protection adhesive 170 can be polymethyl methacrylate (PMMA) or epoxy resin. A thickness of the protection adhesive 170 is about 10-100 micrometers. The second insulating layer 160 covers the bottom surface 112 except for the plurality of connecting pads 131. In the embodiment, the plurality of leads 130 can be made of indium tin oxide (ITO), silver (Ag), copper (Cu), gold (Au), or aluminium (Al).

The plurality of sensor electrodes 120 is arranged in two columns. A width of each electrode of the plurality of sensor electrodes 120 is about 20-200 micrometers. In the embodiment, the sensor electrodes 120 can be made of indium tin oxide (ITO), zinc oxide (ZnO), carbon nanotubes (CNT), silver nanowire, or grapheme.

The first insulating layer 140 covers the plurality of sensor electrodes 120. The first insulating layer 140 and the second insulating layer 160 can be made of the same material.

The conductive layer 150 is arranged on the first insulating layer 140. The conductive layer 150 defines a plurality of openings 151 corresponding to the plurality of sensor electrodes 120. A size of each of the plurality of the openings 151 is larger than a size of each electrode of the plurality of sensor electrodes 120. A gap (as shown in FIG. 3) D is defined from a side edge of the opening 151 to an edge of a sensor electrode 120 facing the side edge of the opening 151. In the embodiment, a width of the gap D is 0-30 micrometers. A width of the each opening of the plurality of openings 151 is 80-260 micrometers. In the embodiment, the openings 151 are formed by yellow light etching or laser etching.

The conductive layer 150 is grounded to prevent signal interference when the finger touches the top surface 111. The conductive layer 150 is electrically coupled to a ground pin of the controller interface 181.

The contact protection layer 190 covers the conductive layer 150 and the plurality of sensor electrodes 120. The protection adhesive 170 is located between the contact protection layer 190 and the second insulating layer 160 to protect the leads 130.

A change in equivalent capacitance between a fingerprint ridge and a fingerprint valley causes a capacitance change when the contact sensing surface 191 is touched by a finger. A fingerprint ridge or fingerprint valley can be identified by the sensor electrodes 120 according to the capacitance change, thereby obtaining fingerprint data of the finger. The sensor electrodes 120 transmit the fingerprint data to the fingerprint identification controller 180.

Figure 5:
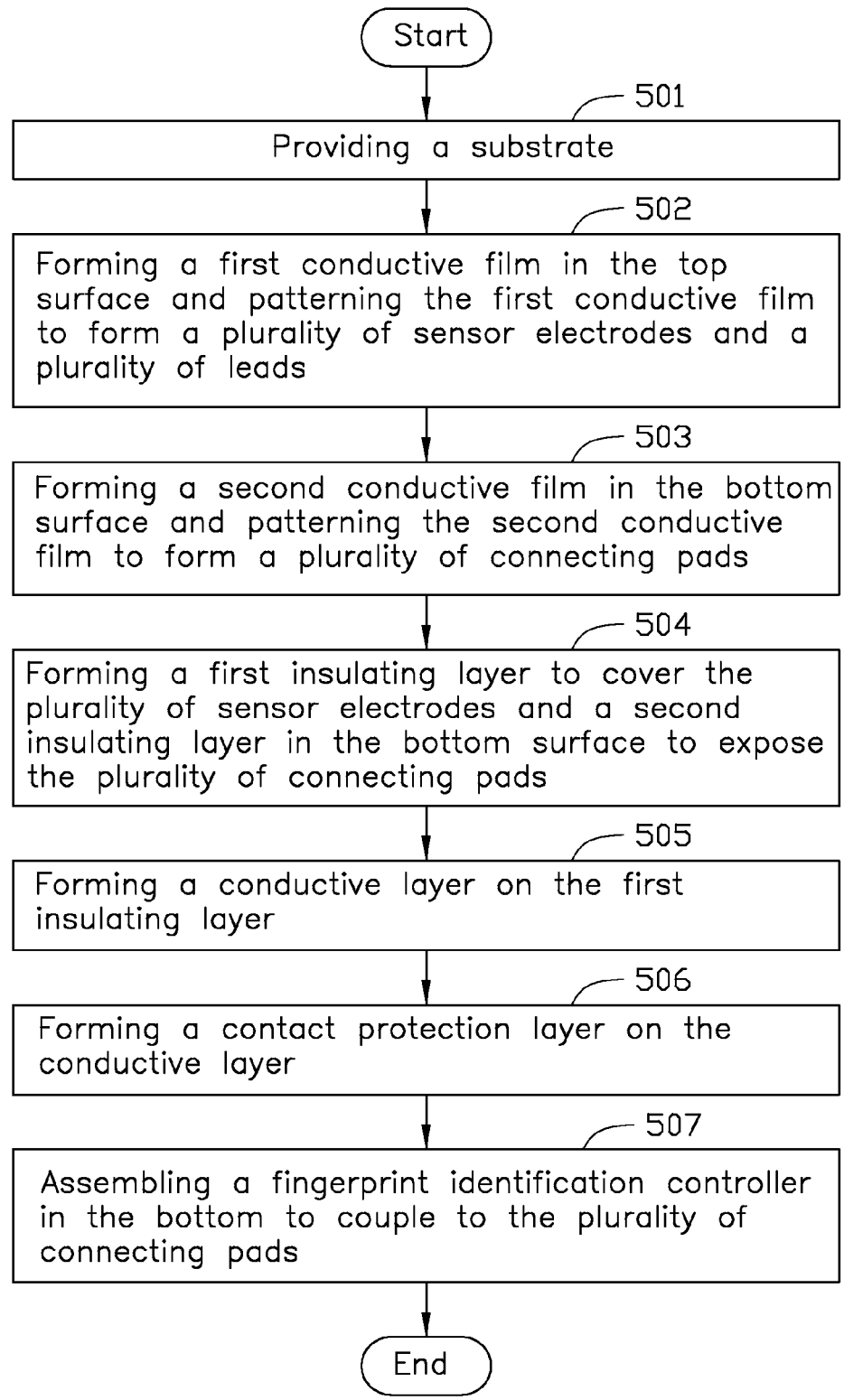
FIG. 5 is a flowchart of a manufacturing method of the fingerprint identification device according to the present disclosure.

FIG. 5 illustrates a flowchart of the manufacturing method of the fingerprint identification device. The method is provided by way of example, as there are a variety of ways to carry out the method. Each block shown in FIG. 5 represents one or more processes, methods, or subroutines which are carried out in the example method. Furthermore, the order of blocks is illustrative only and the order of the blocks can change. Additional blocks can be added or fewer blocks may be utilized without departing from the scope of this disclosure. The example method can begin at block 401.

At block 501, a substrate 110 is provided. The substrate 110 can include a top surface 111, a bottom surface 112 opposite to the top surface 111, and a side surface 113 coupled between the top surface 111 and the bottom surface 112.

At block 502, a first conductive film is formed in the top surface 111 of the substrate 110, and is patterned to form a plurality of the sensor electrodes 120 and the leads 130. A second conductive film is formed in the bottom surface 112 of the substrate 110 and is patterned to form the plurality of connecting pads 131. One end of each lead of the plurality of leads 130 extends along the side surface 113 to the top surface 111, to couple with the sensor electrodes 120. In the embodiment, the first conductive film and the second conductive film are patterned by yellow light etching or laser etching.

At block 503, a first insulating layer 140 is formed to cover the sensor electrodes 120 and a second insulating layer 160 is formed on the bottom surface 112. The plurality of connecting pads 131 is thus exposed.

At block 504, a conductive layer 150 is formed on the first insulating layer 140. In detail, a conductive material layer is deposited on the first insulating layer 140 and a plurality of openings 151 are defined to correspond to the plurality of sensor electrodes 120. A size of each opening of the plurality of openings is larger than a size of each electrode of the plurality of sensor electrodes 120. A gap (shown in FIG. 3) D is defined between the opening 151 and sensor electrode 120. In the embodiment, a width of the gap D is 0-30 micrometers. A width of each opening of the plurality of openings 151 is 80-260 micrometers. In the embodiment, the openings 151 are formed by yellow light etching or laser etching.

At block 505, a protection adhesive 170 is formed on the side surface 113 to cover the plurality of leads 130. In the embodiment, the protection adhesive 170 is formed by spray or printing technology.

At block 506, a contact protection layer 190 is formed on the conductive layer 150.

At block 507, the fingerprint identification controller 180 is assembled on the bottom surface 112 to couple with the plurality of connecting pads 131.

It is to be understood that even though numerous characteristics and advantages of the present embodiments have been set forth in the foregoing description, together with details of the structures and functions of the embodiments, the disclosure is illustrative only; and changes may be in detail, especially in the matter of arrangement of parts within the principles of the embodiments, to the full extent indicated by the broad general meaning of the terms in which the appended claims are expressed.

What is claimed is:

1. A fingerprint identification device comprising:
    a fingerprint identification controller;
    a fingerprint identification sensor, comprising:
        a substrate having a top surface, a bottom surface opposite to the top surface, and a side surface coupled between the top surface and the bottom surface; and
        a plurality of sensor electrodes arrayed on the top surface; and
        a plurality of leads coupling the plurality of sensor electrodes and the fingerprint identification controller,
        wherein at least one lead from amongst the plurality of leads extends from the top surface along the side surface to the bottom surface; the fingerprint identification controller comprises a plurality of controller interfaces, one end of each of the plurality of leads is electrically coupled to the sensor electrode, and the other end of the each of the plurality of leads is electrically coupled to a corresponding one of the controller interfaces.

2. The fingerprint identification device of claim 1, wherein the fingerprint identification sensor comprises a conductive layer arranged on the top surface and insulated from the plurality of sensor electrodes by a first insulating layer.

3. The fingerprint identification device of claim 2, wherein the conductive layer is grounded.

4. The fingerprint identification device of claim 2, wherein the conductive layer defines a plurality of openings corresponding to the plurality of sensor electrodes.

5. The fingerprint identification device of claim 4, wherein a size of each of the plurality of the openings is larger than a size of each electrode of the plurality of sensor electrodes.

6. The fingerprint identification device of claim 5, wherein a gap is defined from a side edge of the opening to an edge of a corresponding sensor electrode facing the side edge of the opening, and a width of the gap is 0-30 micrometers.

7. The fingerprint identification device of claim 1, wherein the fingerprint identification sensor further comprises a protection adhesion covering the side surface to cover the plurality of leads.

8. A fingerprint identification sensor controlled by a fingerprint identification controller, comprising:
a substrate having a top surface, a bottom surface opposite to the top surface, and a side surface coupled between the top surface and the bottom surface;
a plurality of sensor electrodes arrayed on the top surface; and
a plurality of leads extend from the top surface along the side surface to the bottom surface; the fingerprint identification controller comprises a plurality of controller interfaces, one end of each of the plurality of leads is electrically coupled to the sensor electrode, and the other end of the each of the plurality of leads is electrically coupled to a corresponding one of the controller interfaces.

9. The fingerprint identification sensor of claim 8, further comprising a conductive layer arranged on the top surface and insulated from the plurality of sensor electrodes by a first insulating layer.

10. The fingerprint identification sensor of claim 9, wherein the conductive layer is grounded.

11. The fingerprint identification sensor of claim 10, wherein the conductive layer defines a plurality of openings corresponding to the plurality of sensor electrodes.

12. The fingerprint identification sensor of claim 11, wherein a size of each of the plurality of the openings is larger than a size of each electrode of the plurality of sensor electrodes.

13. The fingerprint identification sensor of claim 12, wherein a gap is defined from a side edge of the opening to an edge of a corresponding sensor electrode facing the side edge of the opening, and a width of the gap is 0-30 micrometers.

14. The fingerprint identification sensor of claim 8, wherein the fingerprint identification sensor further comprises a protection adhesion covering the side surface to cover the plurality of leads.

15. The fingerprint identification sensor of claim 14, wherein a thickness of the protection adhesive is 10-100 micrometers.

16. A manufacturing method of a fingerprint identification device, comprising:
providing a substrate having a top surface, a bottom surface opposite to the top surface, and a side surface coupled between the top surface and the bottom surface;
forming a first conductive film on the top surface and patterning the first conductive film to form a plurality of sensor electrodes and a plurality of leads;
forming a second conductive film on the bottom surface and patterning the second conductive film to form a plurality of connecting pads;
forming a first insulating layer to cover the plurality of sensor electrodes and a second insulating layer in the bottom surface to expose the plurality of connecting pads;
forming a conductive layer on the first insulating layer;
forming a contact protection layer on the conductive layer; and
assembling a fingerprint identification controller in the bottom to couple to the plurality of connecting pads.

17. The manufacturing method of claim 16, further comprising:
forming a protection adhesive in the side surface to cover the plurality of leads.

* * * * *